June 17, 1947.　　C. B. KARLSON ET AL　　2,422,555
DRUM SHAPED OIL SEPARATOR DIVIDED BY PARTITIONS INTO
INLET, INTERMEDIATE AND OUTLET SECTIONS
Filed April 20, 1945　　3 Sheets-Sheet 1
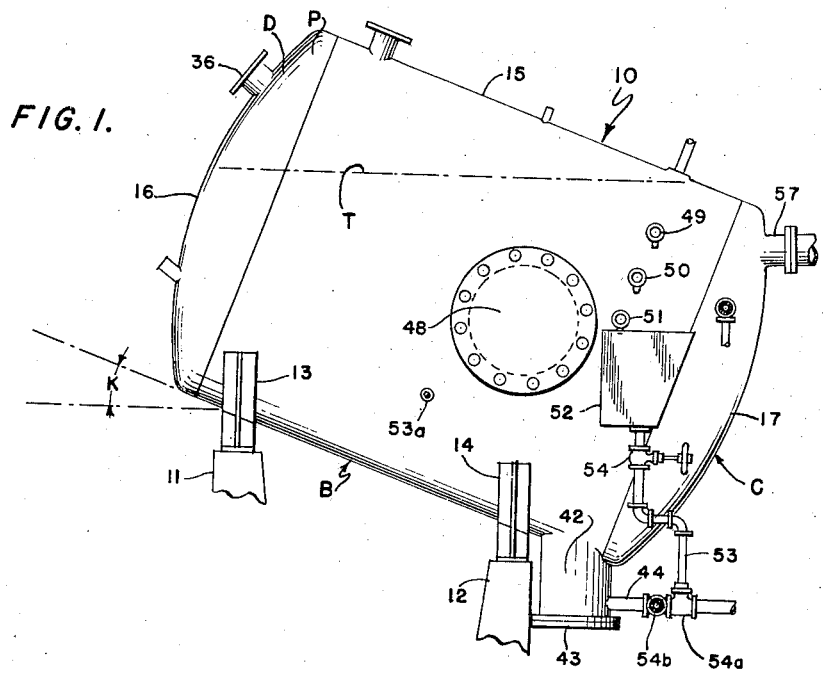
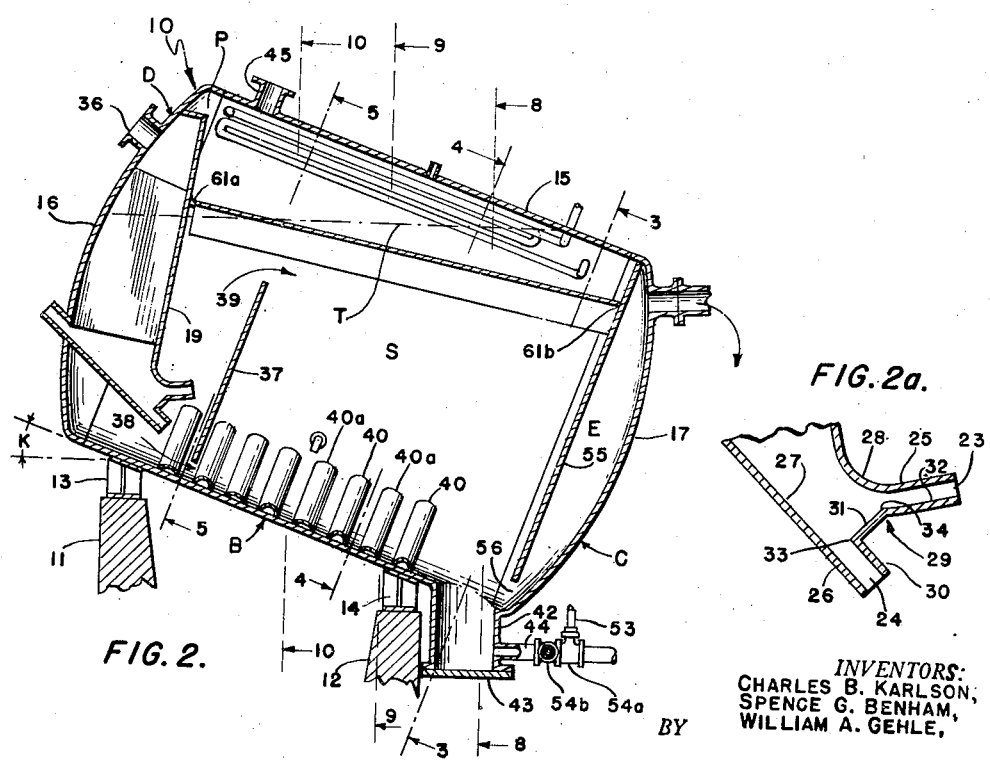
INVENTORS:
CHARLES B. KARLSON,
SPENCE G. BENHAM,
WILLIAM A. GEHLE,
BY
ATTORNEY

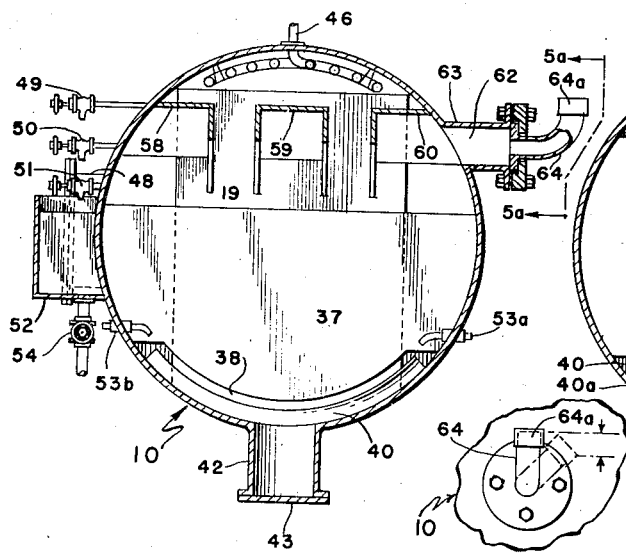
FIG.3.
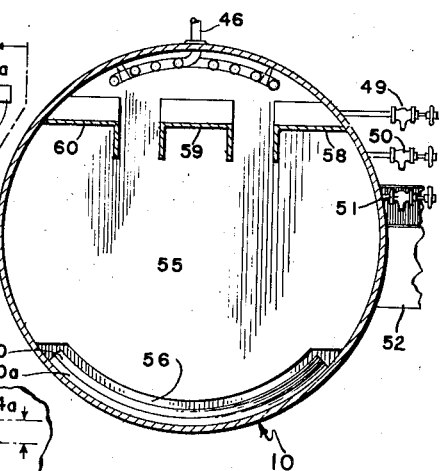
FIG.4.
FIG.5a.
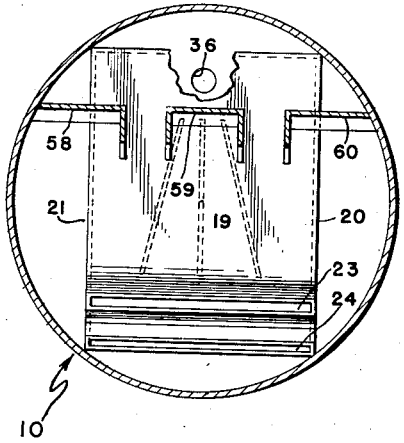
FIG.5.
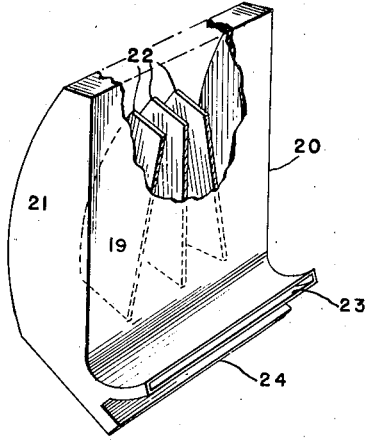
FIG.6.
INVENTORS:
CHARLES B. KARLSON,
SPENCE G. BENHAM,
BY   WILLIAM A. GEHLE,
ATTORNEY

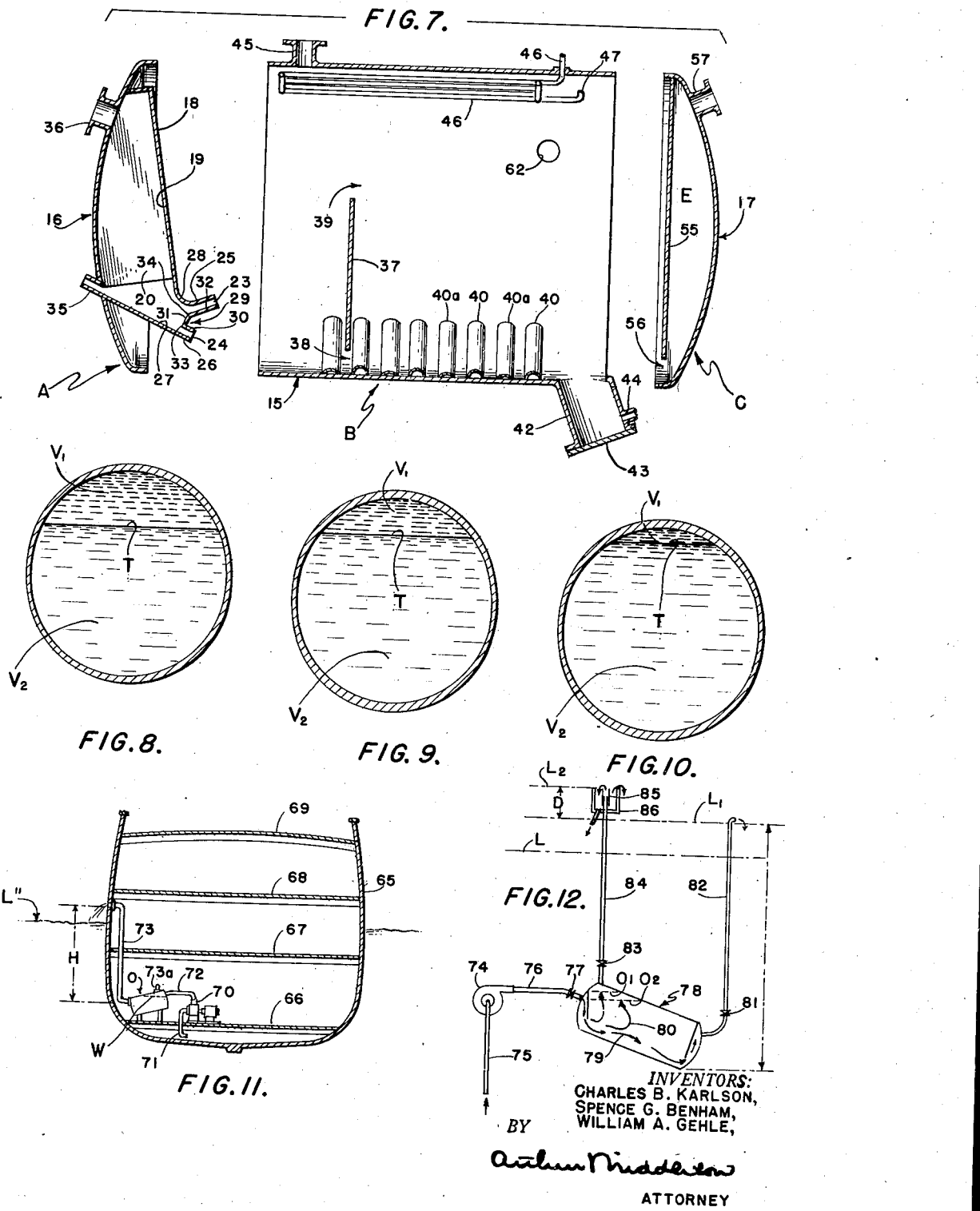

Patented June 17, 1947

2,422,555

UNITED STATES PATENT OFFICE 2,422,555

DRUM-SHAPED OIL SEPARATOR DIVIDED BY PARTITIONS INTO INLET, INTERMEDIATE, AND OUTLET SECTIONS

Charles B. Karlson, Westport, Conn., Spence G. Benham, Brooklyn, N. Y., and William A. Gehle, Arlington, N. J.; said Karlson and said Benham assignors to said Gehle Application April 20, 1945, Serial No. 589,376

6 Claims. (Cl. 210—56)

This invention relates to apparatus for treating a mixture of component liquids having different specific gravities, whereby the component liquids are separated. More particularly, it relates to the separation and recovery of oil or oily substances from water, as in the reclamation of oil from the bilge water of ships, or in the removal of oil and residue from condensate.

This oil separator of the general structural type herein considered works on the principle that the bilge water enters through a submerged inlet into a separator chamber holding a relatively quiescent body of liquid. In passing through this chamber the oil fractionates itself from the water and rises to an outlet while the separated water passes through an overflow connected with the lower portion of the chamber. The upward separation of the oil particles is encouraged partly by their buoyancy as they enter the chamber under a hydrostatic head, and partly due to a baffle system interposed in the flow path of the liquid passing from end to end of the chamber.

This invention proposes to take advantage of certain teachings of the patent to Marsh, No. 2,076,380, disclosing an oil separator which has been highly successful in marine operation. This separator comprises a cast iron chamber of pocket or pouch shape in which the bottom slopes downwardly from the influent end to the effluent end, the bottom being formed with corrugations or rugae extending transversely of the general horizontal flow direction of the liquid through the chamber. The bilge water enters the separator chamber proper through a flat mouth or horizontally extending inlet opening at the bottom where it meets a feed splitting horizontally extending baffle member or bar of certain angular profile giving one stream portion of the influent liquid a downwardly sloping flow impulse and giving another stream portion an upwardly inclined flow impulse. The downwardly directed portion traverses the bottom corrugations toward the deeper end of the chamber or pocket. Thus the upwardly directed portion carries a more readily separable part of the oil upwardly where it collects as an oil layer, while the downwardly directed portion carrying a more finely divided part of the oil reaches the deeper region of the chamber where the increased buoyancy together with the effect of the corrugations will encourage it to separate and to rise leaving separated water to reach the effluent opening at the bottom of the deep end of the chamber. The upwardly directed stream portion meets another baffle to encourage a highly buoyant portion to rise, while causing a less buoyant portion, that is a portion of more finely divided oil to pass into the deeper regions where its buoyancy is increased and also bringing it under the separating influence of the bottom corrugations along with the lower stream portion.

The body of the oil separating device according to the Marsh patent is represented by a relatively complicated or irregular casting somewhat ovoid in plan view and requiring a machined flat top flange portion and a cover plate fitted thereon. The casting also comprises a water discharge passage rising from the bottom at the deep end of the chamber to a point of overflow.

It is among the objects of this invention to produce an oil separator which is in some respects similar to the separator disclosed in the above mentioned Marsh patent, but which can be produced as a welded sheet metal structure of relatively light weight, and without the need of castings.

Another object is to provide an oil separator which is relatively inexpensive to build, and is compact.

Another object is to provide an oil separator having improved separating efficiency.

Another object is to provide an oil separator particularly suited for use on ships, in which undesired disturbances of the quiescent body or mixture in the separator chamber are suppressed or minimized.

Still another object is to provide a marine oil separator requiring a minimum of accessories such as pumps and tanks.

Some of these objects are attained by providing a structure which basically comprises a drum shaped container having sheet partitioning means so arranged as to simulate or approximate the flow and separating conditions existing in the aforementioned separator of the Marsh patent. Such similarity of conditions is furthermore attained by placing the drum shaped container in an inclined position so that there is established a sloping bottom with the higher portion of the drum representing the influent end, and the lower portion of the drum representing the effluent end.

Other objects are attained by operating the separator chamber under a hydraulic head, and so that the liquid in the chamber itself has no overflow level in that the separating water will fill the lower portion and the separating oil the upper portion of the chamber. That is to say the mixture or bilge water is pumped from the bottom of the ship directly into the separator chamber, the pump pressure forcing the separator water through a riser pipe having its outlet disposed above and therefore discharging above the ship's water line. The height of the pipe outlet above the separator chamber represents the height of a hydraulic column under which the chamber operates. The oil collecting above the water in the chamber may be released from the highest level of the drum in a controlled manner intermittently or continuously.

Some of the features of this invention reside in structural, and other features in functional characteristics of the separator.

A structural feature is that the drum shaped container comprises several sub-assemblies, namely a cylindrical body portion and dished inlet and outlet end portions. The inlet end portion or subassembly is unitary with a feed box. The outlet end portion is unitary with an end baffle or partial partition creating a rising water outlet passage.

A more specific feature provides that the feed box of the inlet portion be constructed so as to simulate the feed splitting condition of the separation in the Marsh patent.

Another specific feature provides for a transverse baffle and transverse ridges in the form of half-rounds, simulating the interceptor baffle for the upwardly directed stream portion and the ridges or rugae respectively of the separator in the Marsh patent.

Another feature provides that an oil outlet be provided at a high point of the separator chamber.

Another specific feature provides for an oil outlet connection substantially at the highest level of the inclined cylindrical body portion, which may be used with pressure operation of the separator chamber. An oil outlet at a lower level is provided for use under non-pressure operating conditions, in which case this outlet functions as an oil overflow.

Still another feature provides a cleanout opening at the lowest level of the inclined cylindrical body portion.

It is among the functional features that the separator chamber operates under pressure of a hydrostatic column, so that relatively greater buoyancy is imparted to the oil particles in the mixture within the separator chamber. The oil collecting above the water can be released at the highest point of the inclined drum so that the water-oil break line can be maintained relatively high and a relatively large portion of the drum volume or chamber may be utilized for the separation operation proper.

Another feature is to operate the separator chamber under a hydrostatic pressure, while allowing the water and the oil to overflow separately at points above the separator chamber. This permits to adjust the water-oil break line in the chamber by adjusting the relative overflow levels.

According to one embodiment the pressure operated oil separator is fed directly from the bilge water pump forcing water from the separator chamber against hydrostatic pressure prevailing in the chamber, to a point of discharge above the ship's water line. Oil may be allowed to overflow continuously from an oil riser pipe or column operating in balance with the hydrostatic pressure of the water column.

The invention possesses other objects and features of advantage, some of which with the foregoing will be set forth in the following description.

In the following description and in the claims, parts will be identified by specific names for convenience, but they are intended to be as generic in their application to similar parts as the art will permit. In the accompanying drawings there has been illustrated the best embodiment of the invention known to us, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which Fig. 1 shows the exterior aspect of the oil separator in the form of an inclined drum.

Fig. 2a is an enlarged detail view of a feed inlet mouth portion within the drum.

Fig. 2 is a longitudinal section of the separator shown in Fig. 1.

Fig. 3 is a cross section of the oil separator taken along the line 3—3 in Fig. 2.

Fig. 4 is a cross section of the oil separator taken along the line 4—4 in Fig. 2.

Fig. 5 is a cross section of the oil separator taken along the line 5—5 in Fig. 2.

Fig. 5a is an enlarged detail view (taken in Fig. 3) of an adjustable oil overflow for non-pressure operation of the separator chamber.

Fig. 6 is a perspective detail view of the feed box.

Fig. 7 is a longitudinal section of the oil separator showing sub-assemblies drawn apart.

Figs. 8, 9, and 10 illustrate the pressure mode of operation of the oil separator, showing the water-oil break line according to cross sections 3—3, 4—4, 5—5 in Fig. 2.

Fig. 11 is a diagrammatic view showing the oil separator under pressure operating conditions on a ship.

Fig. 12 is a diagrammatic view showing the oil separator under pressure operating conditions with oil and water overflow through riser pipes.

The oil separator comprises a drum shaped container 10 supported in an inclined position upon foundations 11 and 12 at its upper and its lower ends respectively through corresponding brackets or cradle members 13 and 14 fastened to the container 10.

The container 10 comprises a cylindrical body portion 15, an influent end portion 16, and an effluent end portion 17. These three portions may be said to form parts of sub-assemblies (see Fig. 7) A, B, and C. Thus the sub-assembly A comprises the dished end portion or end wall 16 of the container, and a feed box 18 fixed to the inside of the end wall 16 as by welding. The feed box in turn consists of a front plate 19, sides 20 and 21, and feed distributing baffles 22 within the feed box 18. The lower end portion of the feed box 18 has a pair of flat horizontally extending slot-like feed inlet openings 23 and 24 formed by corresponding flat neck portions 25 and 26, whereby the feed volume is divided into an upwardly inclined and a downwardly inclined stream entering the separator chamber S proper (see also Fig. 2).

The neck portions 25 and 26 are formed by a downwardly sloping bottom portion 27 of the feed box, a forwardly curved lower end portion 28 of the feed box and an intermediate horizontally extending channel shaped dividing wall portion 29. The channel shaped wall portion 29 in turn is characterized by a profile (see detailed Fig. 2ª) which comprises the portion 30, 31, and 32, forming corner points 33 and 34. The portion 30 is downwardly and forwardly inclined, the portion 31 only slightly forwardly and upwardly inclined, while the portion 32 is more strongly forwardly although upwardly inclined. The feed box 18 is shown to have a rearwardly extending connection 35 for boiling out which may be closed by some suitable means (not shown) when not in use. The end wall 16 of the container is provided with a feed inlet connection 36 for the bilge water entering the separator.

The sub-assembly B comprises the cylindrical body portion 15, a transverse interceptor baffle 37 fixed in the body portion as by welding and so disposed as to offer to the inflowing liquid a passage 38 below and a passage 39 above the baffle. The body portion 15 is furthermore provided with transverse ridges 40 and 40ª. The ridges 40 are shown to be of substantially half-round profile while the ridges 40ª are shown to be somewhat shallower. The ridges 40 are alternately arranged with ridges 40ª. The cylindrical body portion 15 is furthermore provided with a sump consisting of a flanged cylindrical portion 42 welded to body portion 15 and provided with a bottom plate 43 which may be removable. From the sump there leads a draw-off pipe connection indicated at 44. Leading from the top or high point of the cylindrical body portion 15 is an oil outlet connection 45. A steam coil 46 for oil heating is mounted in the cylindrical body portion 15 by way of its inlet and outlet connections 46 and 47 respectively. The body portion 15 further has a manhole with cover 48, test cocks 49, 50, and 51 disposed at different levels and a receiving funnel or drip catch 52 for the test cocks, provided with a drain pipe connection 53 with valve 54 leading to the draw-off connection 44 which in turn has a valve 54ᵇ disposed between the sump 41 and a T-coupling 54ª whereby the drain pipe 53 joins the draw-off pipe 44. A pair of boiling-out connections normally closed are also shown at 53ª and 53ᵇ.

The sub-assembly C comprises the end portion 17 to which is welded a transverse wall portion or plate 55 providing a passage 56 underneath the lower end thereof. Near its upper end portion the end wall 17 has a water outlet connection 57.

The sub-assemblies A, B, and C may be welded together to constitute the oil separator unit shown in Figures 1 and 2. Swash baffles 58, 59, and 60 may then be attached to the plate 19 of the feed box at one end and to the wall portion 55 at the other end, and in a manner to provide some clearances or passages 61ª and 61ᵇ between the ends of the swash baffles and their respective supporting plates 19 and 55.

An alternative oil outlet 62 is provided at one side of the cylindrical body portion 15 comprising a horizontally extending pipe portion 63 and a swivel portion 64 attached thereto. By angular adjustment of the swivel portion 64 (see Fig. 5ª) the oil overflow level may be adjusted under conditions of operation hereinafter to be explained. When not in use this oil outlet may be closed by some suitable means not shown.

Fig. 11 illustrates diagrammatically the arrangement of the oil separator O installed under pressure operating conditions as on a ship, the ship being indicated by the cross section of a hull 65 and decks or floor levels 66, 67, 68, and 69. The oil separator O is here shown to be mounted on the lowest floor level 66, that is near the bottom of the ship so that a motor driven pump 70 may draw bilge water against a low suction head through suction inlet pipe 71, and force it into the separator by way of pump outlet connection 72. The pump pressure should be sufficient to overcome the hydrostatic head H of the water outlet pipe or riser 73 leading from the separator and through the ship's hull at a point above the ship's water line L for discharge. The oil-water break line in the separator chamber is indicated at W. The accumulated oil at the top of the separator chamber may be allowed to pass from the chamber intermittently through a controllable valve 73ª to a suitable collecting vessel not shown.

Fig. 12 shows schematically a bilge water pump 74 with suction inlet connection 75 and pressure outlet connection 76 leading through a control valve 77 into the oil separator unit 78 where oil and water separate as indicated by arrows 79 and 80 respectively, the water discharging through a control valve 81 and riser pipe 82 at a level $L_1$, while the oil discharges through a control valve 83 and riser pipe 84 at a somewhat higher level $L_2$. The differential D between the levels $L_1$ and $L_2$ represents the so-called super-elevation of the oil which is due to the differential in specific gravities. The overflow level of the oil is shown to be adjustable as shown by the adjustable screw sleeve member 85. The overflowing oil is intercepted in a tray or overflow box 86 from which it may be discharged to a suitable collecting vessel not shown. The operation is as follows:

If the oil separator unit is to operate under pressure conditions, that is under conditions illustrated in Figs. 11 or 12, the oil overflow outlet 63 is blanked off as by screw cap 64ª. The bilge water is pumped to the inlet 36 under a pressure sufficient to overcome the hydrostatic head of the water column in the riser pipe 73 (see Fig. 11) or the riser pipe 82 (see Fig. 12). The liquid passes downwardly through the feed box 18 and issues as a downwardly inclined stream from the opening 24, and as an upwardly inclined stream from the opening 23. This division of the feed volume at a point of submergence or hydrostatic head roughly separates the feed volume correspondingly into an upwardly directed portion containing a more readily separable portion of the oil and a downwardly directed volume containing the heavier constituents and a less readily separable portion of the oil. The upper stream or portion of the feed liquid meets the baffle wall 37 with the result that the impact thereon encourages separation so that lighter constituents are deflected upwardly while heavier constituents drop and join the lower stream or portion of the feed volume which flows from opening 24. The lower stream being directed towards the bottom passes underneath the baffle wall 37, that is through passage 38 into the deeper regions of the separator chamber S and also across the ridges 40 and 40ª.

Thus further separation is encouraged in the lower stream partly because of the segregating effect of the ridges 40 and 40ª and partly because of the increased buoyancy imparted to the oil particles in the deeper regions of the chamber. In this way water and oil separate according to their specific gravities, forming the tentative break line T. This break line indicates the separated oil and water volumes $V_1$ and $V_2$ respectively in the separator chamber S, this being indicated in the cross sections Figs. 8, 9, and 10.

Under these conditions the oil volume $V_1$ forms an apex P at which it is withdrawn through the connection 45 and allowed to pass off. The removal at the apex means that a relatively small accumulation of oil above the water will suffice to effect the removal of the oil without the danger of drawing water. The separated water passes from the separator chamber S at the lowest point thereof, that is through the passage 56, then up through a space E formed between the end plate 17 and the plate 55, and then out through the outlet connection 57 and through riser pipe 73 (see Fig. 11) or riser pipe 82 (see Fig. 12).

The oil may be let out intermittently as through a control outlet 73$^a$ (see Fig. 11) or it may be allowed to discharge continuously as by overflow through the riser pipe 84 (see Fig. 12). In each instance the oil-water break line T can be checked as by test cocks 49, 50, 51, or by suitable sight glass devices (not shown).

Under the Fig. 12 conditions the level of the water-oil break line in the separating chamber can be varied by adjusting the oil overflow level $L_2$ or the differential between water overflow and oil overflow levels $L_1$ and $L_2$. Such possible variations of the break line are indicated at $O_1$ and $O_2$ in Fig. 12.

If this oil separator unit is to operate under non-pressure conditions, that is under such customary conditions as are described in the aforementioned patent to Marsh, then the oil outlet connection 45 must be rendered ineffective or closed off, while the oil overflow outlet 63 must be rendered effective to function as such. Under these conditions the oil will no longer occupy the apex portion of the separator unit but will form a layer presenting a liquid level in accordance with the overflow adjustment of the outlet 63.

We claim:

1. A drum shaped oil separator unit comprising a feed inlet end section, a discharge end section for separated water, and a cylindrical section intermediate said end sections to form a chamber for the separation therein of oil from water and having oil outlet means for the separated oil, said inlet section representing an assembly unit comprising an end wall, a feed box at the inside of said wall and unitary therewith, feed inlet means at the upper end of said feed box and feet outlet means at the lower end of said feed box leading into said chamber, said discharge section representing an assembly unit comprising an end wall portion, a transverse wall portion unitary with said end wall portion to form therewith a discharge chamber for the separated water, said discharge chamber having an inflow passage at the lower ened thereof and outlet means provided on said end wall portion for separated water.

2. An oil separator unit as defined in claim 1, in which the feed outlet means of the feed box comprises an upwardly inclined and a downwardly inclined feed emitting flattened neck portion.

3. An oil separator unit as defined in claim 1, in which the feed outlet means of the feed box comprises an upwardly inclined and downwardly inclined feed emitting flattened neck portion and the intermediate section comprises a cylindrical wall portion and a baffle wall fixed within and extending transversely of said cylindrical wall portion and disposed and adapted to allow for the passage of liquid below and above said baffle wall.

4. An oil separator unit as defined in claim 1, in which the feed outlet means of the feed box comprises an upwardly inclined and a downwardly inclined feed emitting flattened neck portion and the intermediate section comprises a cylindrical wall portion, a transverse baffle wall fixed within said cylindrical wall portion and disposed and adapted to allow for the passage of liquid below and above said baffle wall, and corrugation forming means fixed interiorly to the bottom of the cylindrical wall portion, the corrugations extending transversely of said cylindrical wall portion.

5. An oil separator unit for the separation of oil from water comprising a feed inlet section, a discharge end section for separated water, and an intermediate section between said end sections to constitute a chamber for the segregation therein of oil from water and having oil outlet means for the segregated oil, said inlet section representing an assembly unit comprising an end wall, a feed box at the inside of said wall and unitary therewith, feed inlet means at the upper end of said feed box and feed outlet means at the lower end of said feed box leading into said segregation chamber, said discharge end section representing an assembly unit comprising an end wall portion, a transverse wall portion unitary with said end wall portion to form therewith a discharge chamber for the separated water, said discharge chamber having an inflow passage at the lower end thereof and outlet means provided on said end wall portion for separated water.

6. An oil separator unit as defined in claim 5, in which the feed outlet means for the feed box comprise an upwardly inclined and a downwardly inclined feed-emitting flattened neck portion.

C. B. KARLSON.
S. G. BENHAM.
WILLIAM A. GEHLE.

REFERENCES CITED

The following references are of record in the file of this patent:

UNITED STATES PATENTS

| Number | Name | Date |
|---|---|---|
| 911,314 | Maranville | Feb. 2, 1909 |
| 1,513,882 | Bateman | Nov. 4, 1924 |
| 2,236,332 | Combs | Mar. 25, 1941 |
| 1,946,415 | Schmid | Feb. 6, 1934 |
| 2,076,380 | Marsh | Apr. 6, 1937 |
| 1,494,670 | Delaney et al. | May 20, 1924 |
| 1,708,021 | Lenz et al. | Apr. 9, 1929 |
| 1,116,903 | McClintock | Nov. 10, 1914 |
| 1,396,889 | Sepulchre | Nov. 15, 1921 |
| 1,958,010 | Meurk | May 8, 1934 |
| 1,889,601 | Heinkel | Nov. 29, 1932 |

FOREIGN PATENTS

| Number | Country | Date |
|---|---|---|
| 138,655 | Great Britain | Feb. 19, 1920 |